N. SHEPLAR & D. SHEPLAR.
Wind-Wheels.
No. 143,100. Patented September 23, 1873.
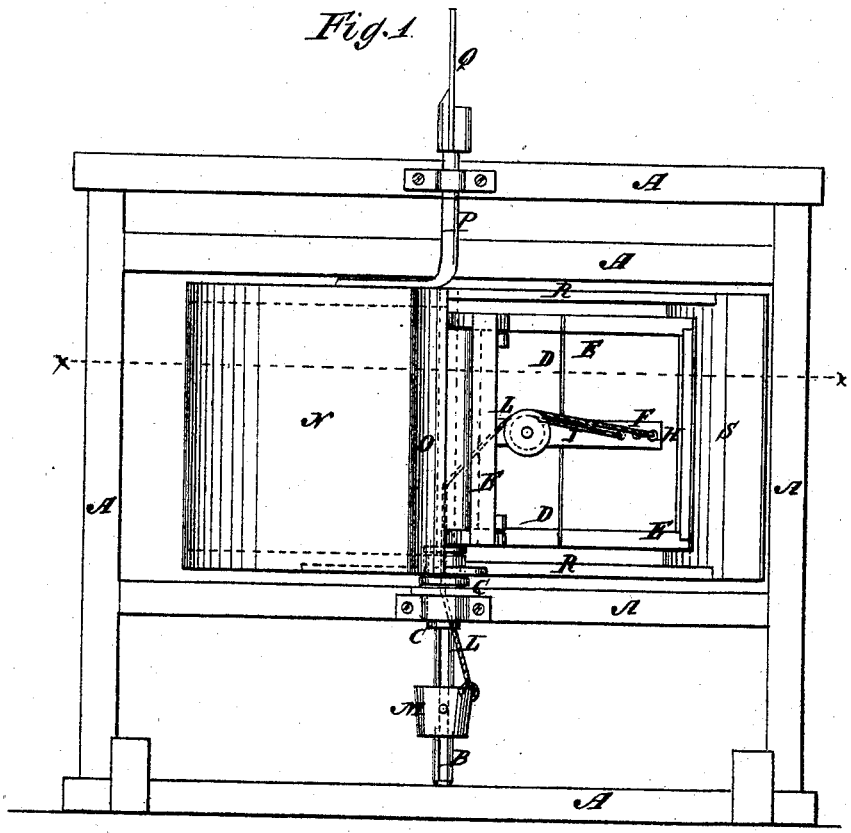
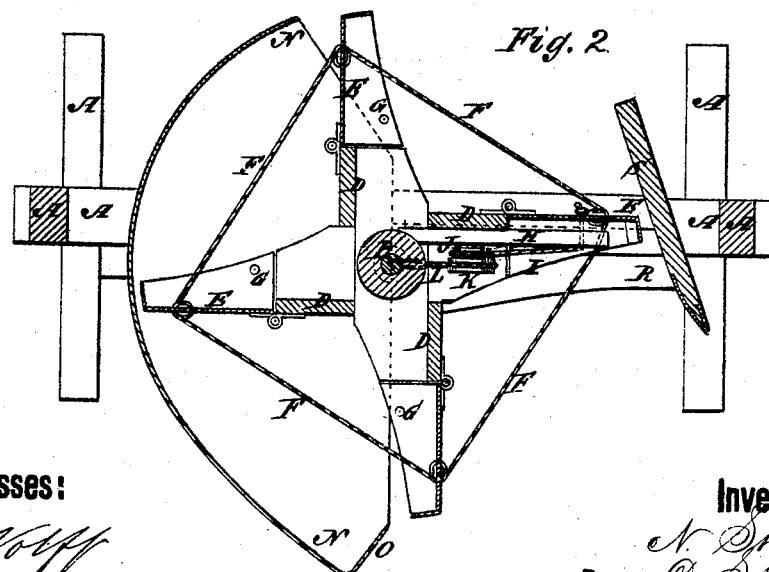
Witnesses:
Inventor:
N. Sheplar
D. Sheplar
Per
Attorneys.

UNITED STATES PATENT OFFICE.

NICHOLAS SHEPLAR AND DANIEL SHEPLAR, OF MURRAYVILLE, ILLINOIS.

IMPROVEMENT IN WIND-WHEELS.

Specification forming part of Letters Patent No. 143,100, dated September 23, 1873; application filed July 19, 1873.

*To all whom it may concern:*

Be it known that we, NICHOLAS SHEPLAR and DANIEL SHEPLAR, both of Murrayville, in the county of Morgan and State of Illinois, have invented a new and useful Improvement in Wind-Wheel, of which the following is a specification:

Figure 1 is a front view of our improved wind-wheel. Fig. 2 is a horizontal section of the same taken through the line $x\ x$, Fig. 1.

Our invention has for its object to furnish an improved wind-wheel which shall be so constructed as to be self-regulating, adjusting itself to run regularly and steadily, however the wind may change in direction and power, and which shall be simple in construction and reliable in operation. The invention consists in an arrangement of regulating apparatus with the hinged wings of the wheel, as hereinafter described.

A represents the frame-work that supports the wheel. B is the wheel-shaft, the lower end of which revolves in a step attached to the lower beam of the frame A. The shaft B also revolves in a sleeve, C, that revolves in bearings attached to the middle beam of the frame A. To the upper part of the shaft B are rigidly attached four or more short wings, D, to the outer edges of which are hinged the wings E. The wings E are all connected and held in the same relative position by a rope or chain, F, which is secured to each of said wings E, and which allows the wings E to move freely upon their hinges. The wings E are made with flanges upon their outer and side edges to confine the wind. To the side flanges of the wings E, near the inner or hinged edge of said wings, are attached cross-bars G, which strengthen the wings and prevent the rope or chain from becoming slack as the hinged wings move into an oblique position. To one of the rigid wings D is attached an arm, H, through the outer end of which the cord or chain F passes. Through the outer end of the arm H also passes a cord, I, the outer end of which is attached to the adjacent wing E. The other end of the cord I is wound around and attached to a pulley or drum, J, pivoted to the inner part of the arm H. Upon the pulley J is formed, or with it is rigidly connected, a pulley, K, to which is attached the end of a cord, L, which is wound around the pulley K in the opposite direction from the cord I. The cord L is passed down through a hole in the wheel-shaft B, and to its lower end, below the sleeve C, is attached a weight, M, which is connected with the shaft B by a tongue and groove or by other means that will cause the said weight to be carried around by and with said shaft, and at the same time will allow the weight to slide up and down freely. The weight M is made of such a size as to hold the wings E against the wind in ordinary circumstances, but, should the wind increase in force, it will turn the wings E back upon their hinges into a position more or less oblique according to the force of the wind. As the wind decreases in force the weight M draws the wings E back into their former position. N is a hood or shield, which is made in the form of a half-drum, and which is designed to cover about one-half of the wheel and protect the returning wings from the action of the wind. To the forward part of the open side of the shield N is attached an inclined board or apron, O, to guide the wind upon the wings E. The lower part of the shield N is attached to the sleeve C, and to its upper end is rigidly attached a shaft, P, which passes up through bearings attached to the upper beam of the frame A. To the upper end of the shaft P is rigidly attached a vane, Q, to hold the shield forward end to the wind, however the direction of the wind may change. To the middle part of the top and bottom of the shield N are attached arms R, which project at the open side of said shield N, above and below the wind-wheel, and to their outer ends are attached a board, S, inclined in such a direction as to gather or guide the wind upon the wings E. The gather-board S is made with a sharp forward edge, and should be weighted to balance the shield M.

The convex side of the shield N may be made with shutters, to be opened in case of storms, to allow the wind to pass through, the shutters hung on hinges by their top edges, their weight holding them in position only in time of storm, when the wind will open them.

Having thus described my invention, I claim as new and desire to secure by Letters Patent—

1. The wings E, hinged at one side to the rigid wings D of shaft B and connected by cords F, in combination with a suitable weight attachment having a function like that shown and described, whereby the movements of said wings are made simultaneously and the pressure on them is equalized, as set forth.

2. The combination of the arm H, cord I, pulleys J K, cord L, and weight M with the hinged wings E, cord or chain F, stationary wings D, and perforated shaft B, substantially as herein shown and described.

NICHOLAS SHEPLAR.
DANIEL SHEPLAR.

Witnesses:
WILLIAM B. BUNCH,
A. I. GUNN,
JAMES W. BUNCH.